Figure 1:
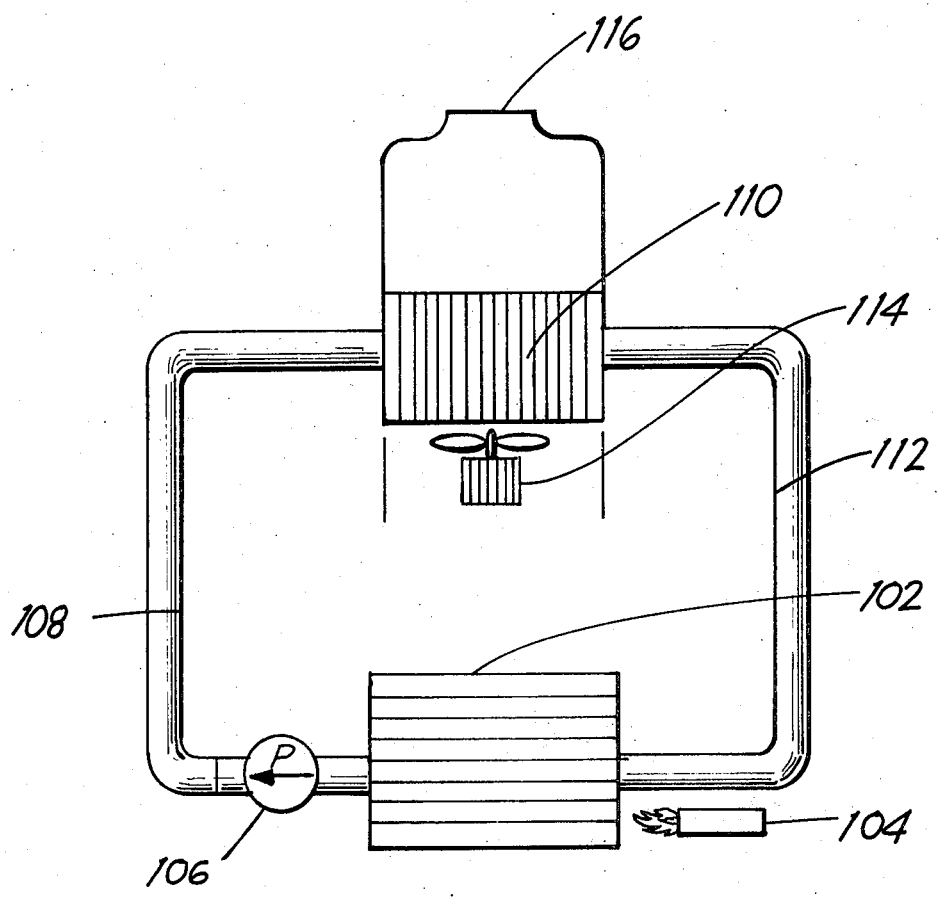

United States Patent [19]
Kirk

[11] 3,794,460
[45] Feb. 26, 1974

[54] CONTROL ARRANGEMENT FOR AIR VENTILATING AND AIR HEATING SYSTEMS HAVING AUTOMATIC RESET AND MANUAL RESET SAFETY DEVICES

[75] Inventor: Harold L. Kirk, Kirkwood, Mo.

[73] Assignee: American Air Filter Company, Inc., Louisville, Ky.

[22] Filed: Oct. 3, 1972

[21] Appl. No.: 294,557

[52] U.S. Cl.............................. 431/37, 236/9
[51] Int. Cl................................... F23n 5/20
[58] Field of Search..... 237/8 R; 236/11, 9; 431/36, 431/37

[56] References Cited
UNITED STATES PATENTS
3,092,095   6/1963   Hottenroth et al............. 431/37 X
2,862,666   12/1958  Kriechbaum..................... 236/11 X

*Primary Examiner*—William E. Wayner

[57] ABSTRACT

An improved control system for an air heating and air ventilating apparatus having a multi-volt electrical power source, a first power control circuit for energizing air ventilating means, and a second power control circuit for energizing the air ventilating means and an air heating means, the second power circuit including safety control means for energizing the second power control circuit in response to an unsafe operating condition and means to energize fuel preheat means at relatively low temperatures.

6 Claims, 2 Drawing Figures

CONTROL ARRANGEMENT FOR AIR VENTILATING AND AIR HEATING SYSTEMS HAVING AUTOMATIC RESET AND MANUAL RESET SAFETY DEVICES

BACKGROUND OF THE INVENTION

In recent years there has been a considerable amount of research and development in the area of control arrangements for air heating and air ventilating apparatus. Many different control arrangements are taught in the prior art which include multi-volt electrical power sources and power control circuits for energizing air ventilating and air heating means either separately or in combination. Many of these control arrangements include safety control devices to de-energize the power control circuits in response to unsafe operating conditions.

SUMMARY OF THE INVENTION

In the present invention, it is recognized that it is desirable to provide a control arrangement for an air heating apparatus including air ventilating means for use in temperatures ranging from about −65°F. to about 125°F. Furthermore, it is recognized that it is desirable to include automatic reset and manual reset safety devices to control air heating apparatus at ambient temperatures of from about −65°F. to about 125°F.

The present invention advantageously provides a straight-forward control arrangement for an air heating and air ventilating apparatus including a multi-volt electrical power source, two power control circuits, one being to operate an air heating and ventilating apparatus and the other being to operate an air ventilating apparatus separately from the air heating apparatus, the power control circuits including safety control devices for controlling and resetting the air heating apparatus in relation to unsafe conditions. The present invention further provides for thermostat means operable at a preselected low temperature to energize control preheat means prior to energization of an air heating apparatus.

Various other features of the present invention will become obvious to those skilled in the art upon reading the disclosure set forth hereinafter.

More particularly, the present invention provides a control arrangement for an air heater having air blower means and air heating means including automatic and manual resetting safety devices, the control arrangement comprising: (a) a multi-volt electrical power source; (b) a first power control circuit connected to the source and operable when energized to cause energization of air blower means, the first power control circuit including relay switch means operable in one position to maintain energization of the first power control circuit under normal operating conditions and operable in an opposite position to de-energize the first power control circuit; and, (c) a second power control circuit connected to the source and operable when energized to cause energization of the air blower means and an air heating means, the second power control circuit including relay switch means operable in one position to energize the air heating means and in an opposite position to de-energize the air heating means, the second power control circuit including thermostat means operable at a preselected low temperature in one position to energize fuel preheat means, the fuel preheat means being energized for a preselected period of time prior to the relay switch means being operable to energize the air heating means.

In accordance with a preferred embodiment of the invention, the control arrangement includes one circuit called a first power control circuit and another circuit which will be called a second power control circuit. The first power control circuit controls the operation of relays and other means through which electrical power is delivered to the ventilating fan. The second power control circuit controls the operation of relays and other means through which electrical power is delivered to the air heating means as well as the ventilating fan. The second power control circuit includes a number of normally closed switches operable to an open position in response to unsafe operating conditions and also includes a thermostat means to energize the liquid fuel preheaters at relatively low ambient temperatures of, for example, below −25°F, the preheaters being energized for a selected period of time before the combustion air blower, ventilating air blower and the fuel pump motor are energized.

Preferably, a time delay arrangement is provided in the second power circuit in order to allow the fuel preheaters an opportunity to preheat the liquid fuel before the combustion air blower, ventilating air blower and the fuel pump motor are energized. It is further preferable that both the combustion air motor and the fuel pump motor are connected in parallel so that they may be energized at the same time in response to a time delay arrangement, the time delay actuating the combustion air motor and the fuel pump motor after a preselected period of time sufficient to allow the preheaters to preheat the liquid fuel.

Figure 2:
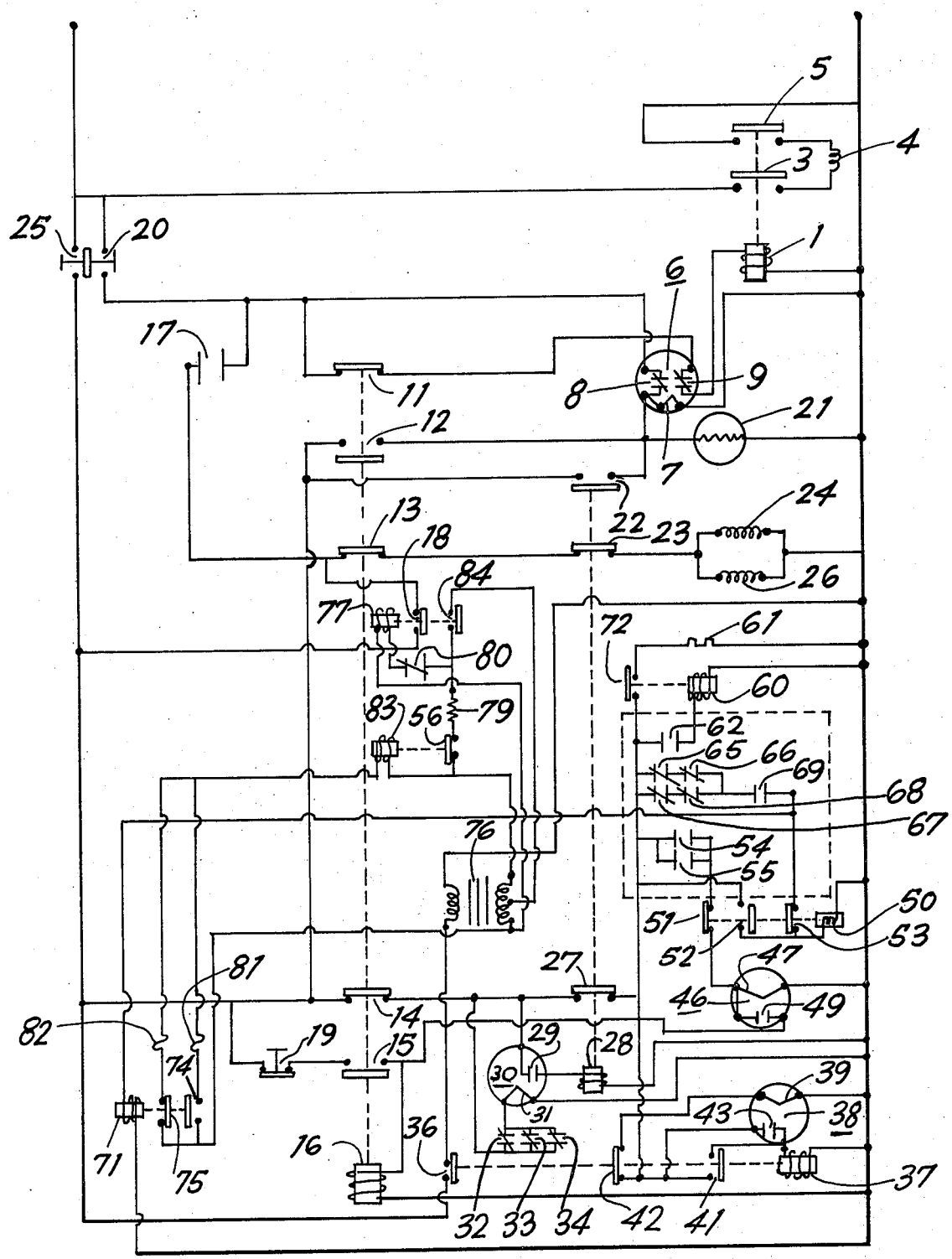

The invention will be described in connection with the accompanied drawing, illustrating the embodiment thereof by way of the example, and wherein:

FIG. 1 is a largely diagrammatic representation of one kind of air heating apparatus to which the invention may be applied; and, FIG. 2 is a schematic representation of a controlled arrangement embodying the invention.

It is believed that the invention will be more readily understood if it is explained as applied to one type of air heater adapted for use with the controlled circuit arrangement of the present invention. Thus, the FIG. 1 representation of an air heater is provided for showing certain basic elements included in such a heater.

In FIG. 1, a first heat exchanger 102 containing a fuel gas burner 104, fuel gas burner 104 being provided to heat liquid which is pumped through a continuous circuit including the liquid pump 106, liquid line 108, second heat exchanger or coil 110 and liquid line 112 back to the first heat exchanger 102. The air is forced through the coil by an electrically powered blower assembly 114 and the heating air is conducted from the outlet 116 on the opposite side of the heat exchanger through ducts (not shown) to be served.

The power control circuits for controlling operation of certain parts of the FIG. 1 apparatus are shown in FIG. 2. All of the circuitry required for operating the apparatus of the nature as illustrated in FIG. 1 is not included in FIG. 2, FIG. 2 illustrating those parts of the circuitry hereinafter characterized as the first power control circuit and the second power control circuit. The first power control circuit is so characterized because it controls the operation of the switches through which the air ventilating fan 114 is operable and the second power control circuit is so characterized because it controls the operation of the switches through which the power for the fuel gas heating apparatus 104 and the air ventilating fan 114 of FIG. 1 is delivered.

Under normal starting conditions, if air ventilation is all that is required, the first power control circuit is actuated to cause energization of the air ventilating fan 114. If air heating is required, the second power control circuit is actuated and serves to cause energization in sequence the fuel preheat means 61, the ventilating fan 114, and then simultaneously the combustion air blower 24 and the fuel pump motor 26 which supplies combustion air and fuel to the fuel gas burning apparatus 104. The manner in which this is accomplished by the circuit of FIG. 2 will now be described.

Lines 100 and 101 are connected to a multi-volt power source, (not shown). With the start switch 20 closed, the ventilating fan contactor 1 will be energized through normally closed contact 11 of safety relay 16 and normally closed contact 9 of time delay relay 6. Energization of contactor 1 closes normally open contacts 3 and 5 thereby energizing the air ventilating fan motor 4. The time delay relay 6 includes the aforementioned normally closed contact 9, a ventilating fan pressure switch 8 and a timing element 7, the ventilating fan pressure switch 8 being operable to an open position as soon as the ventilating fan 114 reaches a predetermined pressure and timing element 7 being in series with switch 8 to operate normally closed contact 9 to an open position in a relatively short period of time, for example, 5 seconds. Thus, at the end of 5 seconds if the air ventilating fan 114 has not obtained a sufficient pressure to open pressure switch 8 thereby deactivating timing element 7, timing element 7 will open contact 9 which will de-energize ventilating fan contactor 1 opening the circuit including the air ventilating fan motor 4. A warning means, such as red warning light 21, is included in the circuit parallel to the timing element 7 and in series with the normally closed contact 8 wherein the warning light 21 will be energized as long as pressure switch 8 is in its normally closed position. Thus, if within 5 seconds the air ventilating fan 114 does not reach the predetermined pressure which causes switch 8 to open thereby de-energizing warning light 21, light 21 will remain on advising the operator of a malfunction of the air ventilating fan 114. Time delay relay 6 is generally adapted to reset itself automatically, therefore the aforementioned sequence of energization of the elements of the first power control is repeated, if necessary, until the ventilating fan pressure switch 8 is actuated by the air blower of the contact start switch 20 is manually opened.

The second power control circuit operates the air heating means as well as the air blower means, the circuit being actuated by closing manual start switch 25. Closing of start switch 25 energizes time delay relay 38 through normally closed contacts 14, 27, and 42. Time delay relay 38 includes timing element 39 and normally open contact 43, normally open contact 43 being operable to a closed position after a predetermined length of time, say about three minutes, after energization of timing element 39.

The remainder of the second power control circuit remains de-energized during the time delay except for preheater 61 which is operable in response to thermostat means 62. During the three minute time delay, the fuel preheater 61 may be energized during this period by closing the normally open contact 72, contact 72 being operable to a closed position upon energizing contact relay 60. Contact relay 60 is in series with condition responsive thermostat switch 62, condition responsive thermostat switch 62 being in a normally open position, the condition to which this switch responds being at temperatures below a predetermined temperature, such as, for example, −25°F. Therefore, if the temperature is below −25°F., the normally open condition responsive switch 62 will close thereby energizing the contact relay 60 which closes normally open contact 72 thereby providing energization of the preheater 61. Thus, preheater 61 has a period of three minutes in which to preheat the fuel for the heating apparatus.

Upon the closing of contact switch 43 in response to the timing element 39, contact relay 37 is energized thereby closing normally open contact switch 41 and opening normally closed contact switch 42. The opening of the normally closed contact switch 42 de-energizes the filament 39 in the time delay relay 38. Energization of contact relay 37 is maintained, however, in a holding circuit through contact switch 41, contact 37 remaining energized even after the time delay relay filament 39 has been de-energized. Energization of contact relay 37, in addition to the opening of switch 42 and closing switch 41, closes normally open switch 36 thereby energizing protector relay transformer 76 which supplies energy to contact relay 77 through normally closed switches 80 and normally closed contact switch 56. Energizing of contact relay 77 closes normally open contact switch 18 thereby energizing the combustion air blower motor 24 and the fuel pump motor 26 through normally closed contact switches 13 and 23.

A normally open combustion air pressure switch 17 is provided and is operable to a closed position upon the combustion air blower reaching a predetermined pressure. Upon closing of switch 17, air ventilating fan 114 is actuated through the circuit previously described as the first power control circuit.

A contact relay 71 is provided for actuating a portion of the circuit including a flame detector 81 and a flame detector simulator 82 by operating normally open switch 74 to a closed position and operating normally closed switch 75 to an open position. Contact relay 71 is energized in response to condition responsive contact switches 65, 66, 67, 68 and 69, contact switches 65, 67, and 68 being normally closed switches and contact switches 66 and 69 being normally open switches. The conditions to which these condition responsive switches respond will be discussed hereinafter. The contact relay 71 when energized, opens normally closed switch 75 dropping the flame detector simulator 82 out of circuit and closes normally open switch 74 thereby energizing the flame detector 81.

Flame detector 81 is a flame responsive device having an infinitely high resistance when exposed to a "no flame" condition and upon exposure to a "flame" condition the resistance diminishes. Flame detector simulator 82 is a simulating device for the flame detector 81 when the flame detector 81 is not in operation.

Simulator 82 upon initial energization has an equivalent resistance as flame detector 81 when exposed to flame of, for example, approximately 1,000 ohms.

Flame detector 81 and simulator 82 are located in series with a contact relay 82. Thus, when either detector 81 or simulator 82, depending upon which one is being energized and detector 81 "senses" flame, the resistance in series with contact relay coil 83 is sufficiently low enough to permit a flow of current to energize relay coil 83 and open contacts 56, the holding contact 80 remaining in the closed position keeping relay coil 77 energized and contacts 18 and 84 remaining closed. Opening of switch 56 deactivates a warp switch heating element 79 and relay 77 is retained in the energized condition through holding contacts 84. Thus, with relay 77 in a closed condition, contacts 18 remain closed keeping the combustion air blower motor 24, fuel pump motor 26, and ventilating fan motor 4 energized.

Furthermore, when flame detector 81 fails to sense the presence of flame within the prescribed time, for example 15 seconds, it takes heater 79 to activate a warp switch which will open switch 80, coils 77 and 83, contacts 18 and 84 thereby de-energizing the combustion air blower motor 24. Thus, the opening of switch 80 by the warp switch actuator connected to heater 79 deactivates the heater and will require manually resetting of switch 80 before the unit can be restarted.

Condition responsive switches which energize contact relay 71 may be normally open or closed switches actuated to their opposite position upon sensing different conditions during the operation of the equipment. For illustration purposes, switch means 65 is a thermostat switch set to open in response to the preselected discharge air temperature being outside the range of, for example, 140° to 180°F.; switches 66 and 68 are pressure switches operable in response to the flow of return air in a return air duct (not shown), switch 68 being normally closed but opening and switch 66 being normally open but switch 66 closing if the return air duct is disconnected; and, switch means 67 is a thermostat switch which senses the temperature of the return air from a conditional space and is set to open in response to the return air from a conditional space and is set to open in response to the return air temperature being outside the range of, for example, 140° to 180°F. Contact switch 69 is a normally open ventilating fan pressure switch which closes when the ventilating fan reaches a preselected pressure setting. Therefore, since switch 69 must be closed in order to energize contact relay 71, contact relay 71 can only be energized after the ventilating fan is up to operating conditions. Furthermore, the energization of relay 71 is dependent upon switch 65 remaining closed in combination with normally open switch 66 being actuated to a closed position or switches 67 and 68 remaining closed. Thus, if the ventilating fan is up to operation conditions and the return air, if the return air duct is connected, is between 140° and 180°F., or the discharge air is between 140° and 180°F. if the return air duct is disconnected, contact relay 71 will be energized.

A time delay relay 30 including timing element 31 is provided, timing filament 31 being energized through normally closed contact switch 14 and any one of the parallel connected normally closed contacts 32, 33, or 34, contact switch 32 being a combustion air pressure switch opening in response to the combustion air blower pressure reaching a preselected pressure, contact switch 33 being a ventilating fan pressure switch opening in response to the ventilating fan reaching a preselected pressure, and contact switch 34 opening when the pressure in the fuel pump reaches a preselected setting. All of the preselected pressure settings for the ventilating fan, the combustion air blower, and the fuel pump are at or below operating conditions whereby under normal operations the switches 32, 33 and 34 will be open, but if any one of the operating conditions are not met the appropriate pressure switch will remain closed thereby energizing timing element 31.

A time delay relay 46 including timing element 47 and normally open contact switch means 49 is also provided. Timing element 47 is energized in response to the closing of either of the normally open condition responsive switches 54 and 55 through normally closed contact switch 51, condition responsive switch 54 being, for example, a metal overheat switch which closes upon the detection of the metal of the heat exchanger becoming dangerously hot and condition responsive switch 55 being an air overheat switch which closes upon the detection of a dangerously hot air temperature. Since these switches are in parallel, if either one of these conditions are present, the timing filament 47 will be energized and after a preselected period of time will close normally open contact 49 thereby energizing safety relay contactor 16. Safety relay contactor 16 upon energization opens normally closed contact switch 11, closes normally open contact switch 12, opens normally closed contact switch 13, opens normally closed contact switch 14, and closes normally open contact switch 15. Thus, upon energization of the safety relay 16, the unit will be de-energized with only the red warning light 21 being energized through the closing of contact switch 12. The unit will remain in this condition until the manual reset switch 19 is opened, manual reset switch 19 maintaining energization to contact relay 16 through closed normally open contact switch 15.

A solenoid valve 50 in parallel with contact relay 71 and actuated in response to condition responsive switches 65, 66, 67, 68, and 69, as hereinbefore discussed, is provided to deactuate time delay relay 46 by opening normally closed contact switch means 51. If the ventilating fan combustion air blower and the fuel pump are operating at their preselected operating conditions, solenoid valve 50 is energized and normally closed contact switch means 51 is opened, and normally open switch means 52 and normally open contact switch means 53 are closed. Once the solenoid valve 50 is energized through normally closed switch 53, normally closed switch 53 is opened and solenoid valve 50 is energized through contact switch 52. Energization of solenoid valve 50 through contact switch 52 removes the solenoid valve 50 from the circuit including the aforementioned condition responsive switches. Furthermore, energization of solenoid valve 50 opens normally closed contact switch 51 thereby preventing energization of the aforementioned time delay relay 46. Thus, as long as solenoid valve 50 is energized, time delay relay 46 is de-energized.

In the operation of the second power control circuit when the start switch 25 is closed, timing element 39 of time delay 38 is actuated through normally closed contacts 14, 27, and 42. Timing element 39 has a delay of three minutes before it activates normally open switch 43 to a closed position thereby energizing contact relay 37.

During this three minute time delay, if the ambient temperature is below −25°F. normally open contact switch 62 closes thereby energizing contact relay 60 through normally closed contacts 147 and 27. Upon energization of contact relay 60, normally open contact switch 72 closes, thereby energizing preheater 61, preheater 61 being for the heating of the fuel for the fuel pump.

After the three minute time delay of timing element 39, normally open switch 43 is closed thereby energizing contact relay 37. Upon energization of contact relay 37, normally open contact switch 41 closes and normally closed contact switch 42 opens, opening of contact switch 42 de-energizes timing element 39, but contact switch 41 is in parallel with switch 42 and maintains the contact relay 37 energized through a holding circuit which includes closed contact switches 41 and 43. Contact relay 37 also closes normally open contact switch 36 thereby establishing a circuit which includes the combustion air blower motor 24 and the pump motor 26. The circuit including the combustion air blower motor 24 and the fuel pump motor 26 is established through the energizing of contact relay 77 which closes normally open contact switch 18. Contact relay 77 is energized through the secondary side of transformer 76, normally closed switch 80, safety heater 79, and normally closed contact switch 56, transformer 76 being actuated by the closing of contact switch 36.

As soon as the combustion air blower reaches a preselected pressure, normally open switch 17 closes thereby establishing a circuit which actuates the ventilating air blower. When the ventilating air blower reaches a preselected operating pressure, normally open contact switch 69 will then close thereby energizing contact relay 71. Contact relay 71 opens normally closed contact switch 75 dropping the flame detector simulator 82 out of the circuit and closes normally open contact switch 74 energizing the flame detector 81.

If the combustion air blower, the ventilating fan, or the fuel pump motor do not reach their operating conditions, timing element 31 will be energized and after a preselected period of time will close normally open contact switch 29 thereby energizing contact relay 28 which operates to open contact switches 27 and 23, and closes contact switch 22. Opening switches 27 and 23 de-energizes the combustion air blower and fuel pump motor. Closing of contact switch 22 energizes warning light 21. As soon as the contact relay 28 is energized shutting down the combustion air blower and the fuel pump, relay 28 is de-energized thereby closing switch 27 which energizes time delay relay 38 through timing element 39. At the end of the three minute timing period, timing element 39 actuates normally open contact switch 43 to a closed position and the system is reset, recycling itself every three minutes or until the condition that prevented the opening of contact switches 32, 33, or 34 is corrected.

After the combustion air pressure switch 32, the ventilating air pressure switch 33, and the fuel pump pressure switch 34 have opened, the unit is in the heating mode with the solenoid valve 50 being actuated by the demand of the thermostats 67 and 65, the thermostat 67 sensing the return air from the conditioned space and thermostat 65 maintaining the discharge air temperature between 140° and 180°F. If either of the aforementioned conditions exist and either the normally closed switch 65 or 67 opens solenoid valve 50 will not be energized, then timing element 47 of time delay relay 46 through normally closed contact 51 may be actuated if switch 54 or 55 closes in response to their preselected condition. Timing out of timing element 47 closes normally open contact switch 49 thereby energizing contact relay 16. Energizing of contact relay 16 opens contact switches 11, 13 and 14, and closes normally open contact switch 12 thereby de-energizing the combustion air blower and the fuel pump and energizing warning light 21. Normally open contact switch 15 is also closed by the energization of contact delay relay 16 thereby maintaining the contact relay 16 in a holding position until manual reset switch 19 is opened. Opening of manual reset switch 19 de-energizes contact relay 16 thereby actuating normally closed switches 11, 13, and 15 to their normally closed positions. Thus, the unit can only be restarted by manually resetting manually operated switch 19.

Under normal operations, as soon as the ventilating fan reaches the preselected operating pressure, contact switch 69 closes thereby energizing contact relay 71 and solenoid valve 50 through normally closed contact switch 53, energizing of solenoid valve 50 opens contact switch 51 and prevents activation of time delay relay 46, relay 46 being the actuating device for the contact relay 16. Contact relay 71 upon being energized drops out of the circuit the flame detector 82 by opening normally closed contact switch 75 and actuates flame detector 81 by closing normally open contact switch 74. As mentioned previously, as long as the flame detector 81 senses a flame in the burning apparatus, detector 81 will maintain a low enough value of resistance (approximately 1,000 ohms) to allow a minute amount of current to open contacts 56 with coil 83 cutting off power to the warp switch heater 79. Thus, the unit will continue to operate as long as detector 81 senses a flame in the burning apparatus. However, if the flame goes out, the resistance of the detector 81 increases to an infinitely high value, thus, blocking the current from coil 83 allowing contacts 56 to close and energize warp switch heater 79, which after a preselected period of time opens switch 80 de-energizing coil 77 and opening contacts 18 and 84. When contacts 18 open, the combustion air blower motor 24 and the fuel pump 26 are de-energized.

If the ventilating fan does not come up to normal operating conditions, contact switch 69 does not close and flame detector simulator 82 will remain in the circuit, solenoid valve 50 will not close and the unit will not try to operate as a heater. Furthermore, contacts 33 will remain closed causing time delay 30 to actuate relay coil 28 thru time delay contacts 29 thereby opening contacts 27 and 23 and closes contacts 22. Opening contacts 27 and 23 de-energizes combustion air blower motor 24 and fuel pump motor 26. Closing contacts 22 permits the time delay 6 to time out and de-energize ventilating air blower motor 4.

What is claimed is:

1. In a control arrangement for an air heater having air blower means and air heating means and including automatic and manual reset devices; (a) a multi-volt electrical source; (b) a first power control circuit connected to said source and operable when energized to cause energization of an air blower means, said first power control circuit including relay switch means operable in one position to maintain energization of said first power control circuit under normal operating conditions and in an opposite position to de-energize said power control circuit, said first power control circuit including time delay reset means; (c) a second power control circuit connected to said source and operable when energized to cause energization of said air blower means and air heating means, said second power control circuit including relay switch means operable in one position to energize said air heating means and in an opposite position to de-energize said air heating means; and, (d) said second power control circuit including a time delay means and a thermostat means, said time delay means operable to delay for a preselected period of time energization of said air blower means and air heating means, said thermostat means being operable at a preselected low temperature in one position to energize fuel preheat means and in an opposite position to de-energize fuel preheat means during the delay of said time delay means.

2. The control arrangement of claim 1, said second power control circuit includes time delay means through which a part of said second power control circuit is initially maintained deenergized for a preselected time whereby said fuel preheat means is initially energized.

3. The control arrangement of claim 1, said second power control circuit including flame detection means whereby upon detection of the loss of a burner flame for said air heating means, said air heating means will be de-energized.

4. The control arrangement of claim 1 including normally closed condition responsive switch means in parallel, one switch responding to an open position upon said air blower means reaching a preselected operating condition, at least one other switch responding to an open position upon said air heating means reaching preselected operating condition, said parallel switches being in series with a time delay relay means which actuates means to de-energize portions of said second power control circuit including said air heating means.

5. The control arrangement of claim 1 including contact relay means operable to de-energize said second power control circuit in response to certain normally open condition responsive switches operating to closed positions.

6. The control arrangement of claim 1 including a contact relay means operable to de-energize a portion of said second power control including said air heating means, said air heating means including a combustion air blower and a fuel pump motor operable in response to the closing of selected normally open conditions responsive switches.

* * * * *